United States Patent
Stout

[11] 3,892,662
[45] July 1, 1975

[54] CLOSED RECYCLING SYSTEM FOR WATER PURIFICATION AND WASTE REDUCTION

[75] Inventor: Daniel W. Stout, North Palm Beach, Fla.

[73] Assignee: Gerald C. Daniels, North Palm Beach, Fla. ; a part interest

[22] Filed: Aug. 1, 1973

[21] Appl. No.: 384,511

[52] U.S. Cl. .................. 210/66; 62/58; 210/71; 210/152; 210/73
[51] Int. Cl. ............................................. C02b 1/12
[58] Field of Search .............. 62/58; 210/10, 65, 66, 210/70-73, 152, 181, 194, 195, 200, 205

[56] References Cited
UNITED STATES PATENTS

| | | | |
|---|---|---|---|
| 3,268,080 | 8/1966 | Eberly | 210/180 |
| 3,276,994 | 10/1966 | Andrews | 210/66 |
| 3,304,991 | 2/1967 | Greenfield | 210/73 |
| 3,314,881 | 4/1967 | Tuwiner | 62/58 |
| 3,677,404 | 7/1972 | Staffin | 210/152 |
| 3,699,592 | 10/1972 | Minchak | 210/152 |
| 3,755,530 | 8/1973 | Avila et al. | 62/58 |

Primary Examiner—Samih N. Zaharna
Assistant Examiner—Peter A. Hruskoci
Attorney, Agent, or Firm—Clarence A. O'Brien; Harvey B. Jacobson

[57] ABSTRACT

A waste purification and reduction, water purification and recycling process comprises collecting and storing household, commercial or industrial waste, homogenizing the waste and reducing the solid content thereof to uniform fine particle size, injecting the homogenized waste through an atomizing nozzle, cryogenically freezing the atomized waste into crystalline particles of uniform size, centrifugally separating the crystals into water crystals and light and heavy solid waste crystals, heating the water crystals to steam and condensing the steam to water, incinerating the solid waste crystals to combustion gas and ash, venting the combustion gas and collecting the ash. In another embodiment of the process, the water vapor in the atomized waste is removed by vacuum prior to freezing. The water vapor is heated to steam and the cryogenically frozen solid waste crystals are incinerated to combustion gas and ash, after which the gas is vented and the ash is collected.

23 Claims, 3 Drawing Figures

CLOSED RECYCLING SYSTEM FOR WATER PURIFICATION AND WASTE REDUCTION

BACKGROUND OF THE INVENTION

1. Field of the Invention

The present invention relates to water purification and recycling and waste reduction and, more particularly, to a self-contained system for continuously processing household, commercial and industrial wastes and recycling the water content thereof.

2. Description of the Prior Art

Water is stored in vast watershed areas and pumped to large processing plants and then to the consumer through huge pipe systems. Dams are constructed, rivers are diverted and the balance of nature is otherwise upset to supply water and treat sewage. Our present water networks are a refined and complicated version of the Roman aqueduct system. Present subject the population to drought, agricultural run-off, contamination by internal pollution and industrial output. In addition, the fixed nature of the utilities provides for minimum flexibility. The resulting potable water, if not contaminated, may well be loaded with distasteful and often foul smelling purification chemicals. Chemical treatment of water to potable quality with chlorine is of questionable long term value as it may itself be a potential health hazard, suspect, but not proven, as a causative agent in the high incidence of heart failures and related circulatory problems such as phlebitis, pulmonary embolism and stroke.

Waste collection and treatment systems in use are even larger than the supplying water networks, consisting of a monstrous spider web of sewers culminating at large plants. The effluent from the plants are dumped in public waters or piped to questionable systems or injected into untried deep wells. Almost all existing sewage plants are either now overloaded or will shortly be overloaded. Inasmuch as in-use sewage treatment systems are slow and cumbersome any operational breakdown in such systems necessitates the dumping of raw sewage until correction and repairs can be accomplished.

Generally, present sewage treatment as inefficient, wasteful, undependable and expensive. The systems have long passed the critical point with almost all populated areas of the world contaminated. Solutions to the problem are posing a serious burden to taxpayers. Construction moratoriums in effect or expected offer a serious threat to one of our most productive and prosperous industries and create not only a serious economic problem but deprive the population of needed shelter and seriously hamper orderly real estate development.

SUMMARY OF THE INVENTION

Accordingly, it is an object of the present invention to provide a waste purification and reduction and water purification system which is self-contained and accomplishes its purposes without introduction of chemical purifiers into the waste.

It is another object of this invention to provide a waste purification system which continually recycles the water content of the waste and obviates the need for external water input and sewage systems.

It is still another object of this invention to provide a sewage purification, waste reduction and water purification system which is capable of accepting household, commercial or industrial waste as influent, which separates and disposes of the waste content thereof, which purifies the water content thereof, and which recycles the purified water for reuse in the household, commerical or industrial plant as hot and cold water.

Briefly stated, in accordance with the aforesaid objects, the present invention provides a process and apparatus for water purification, recycling and conservation combined with waste reduction and disposal. Household sewage or commercial and industrial waste is collected, homogenized and solid waste particle size reduced, following which the sewage is atomized into a cryogenic environment where it is instantly frozen into crystalline form. The crystals are homogenized and further reduced in size until the mass of crystals take on the characteristics of a liquid. Separation of the water crystals from the light and heavy solid waste crystals is accomplished in a centrifugal separator and the water crystals are converted to steam. Alternatively, water vapor is removed from the atomized sewage prior to freezing whereupon only the solid waste freezes into crystalline form. The water vapor is converted to steam. The steam is all condensed and recycled to the household, commercial or industrial plant and in small part utilized as a heat source for the condensed steam to furnish hot water. The solid waste crystals are incinerated and the combustion gas and ash separated and disposed of by venting and collection, respectively.

BRIEF DESCRIPTION OF THE DRAWINGS

The invention will be better understood from the following description taken in conjunction with the accompanying drawings.

DETAILED DESCRIPTION OF THE INVENTION

Generally, the present invention contemplates a sewage purification and reduction and water purification and recycling system which can accept as influent water of any state of purity, i.e., organically or chemically polluted, stagnant or brackish. Following processing according to the invention the waste content is disposed of and the water content is recycled as pure, and potable and suitable for household use. From original introduction into the system the only need for replacement of water is for water lost through evaporation or through transportation from the system site. The system operates on the principle of continuous processing of small quantities of influent. For example, a unit of appropriate size for the average household would process, on a continual basis, approximately 20 cubic centimeters of water per second. In all but the most arid areas replacement of lost water could be accomplished by the collection and introduction of rain water into the influent storage unit.

Inasmuch as the present system provides needed sewage treatment capacity without discharging wastes to the environment, utilization of the present system will provide for orderly, safe and flexible real estate development. Existing useless land will become practical for occupany with no strain on the local ecology. If employed in volume, the present system will accomplish a major step toward the solution of present and future ecological problems relating to water quality and shortage and to sewage and chemical pollution. It will be appreciated that while the primary contemplated usefulness of the system is in connection with household waste treatment on the basis of individual residences or groups of residences, the same principles may be applied on a larger scale to provide recycling and purification in industrial use. On an industrial scale, depending upon the specifics of the plant and industry involved, the present system may well effect considerable savings in terms of water costs, utilization of waste or existing under-utilized energy sources, recovery and re-use of residues and reduction of taxes incident to decreased sewage dumping into the waterways.

Figure 1:
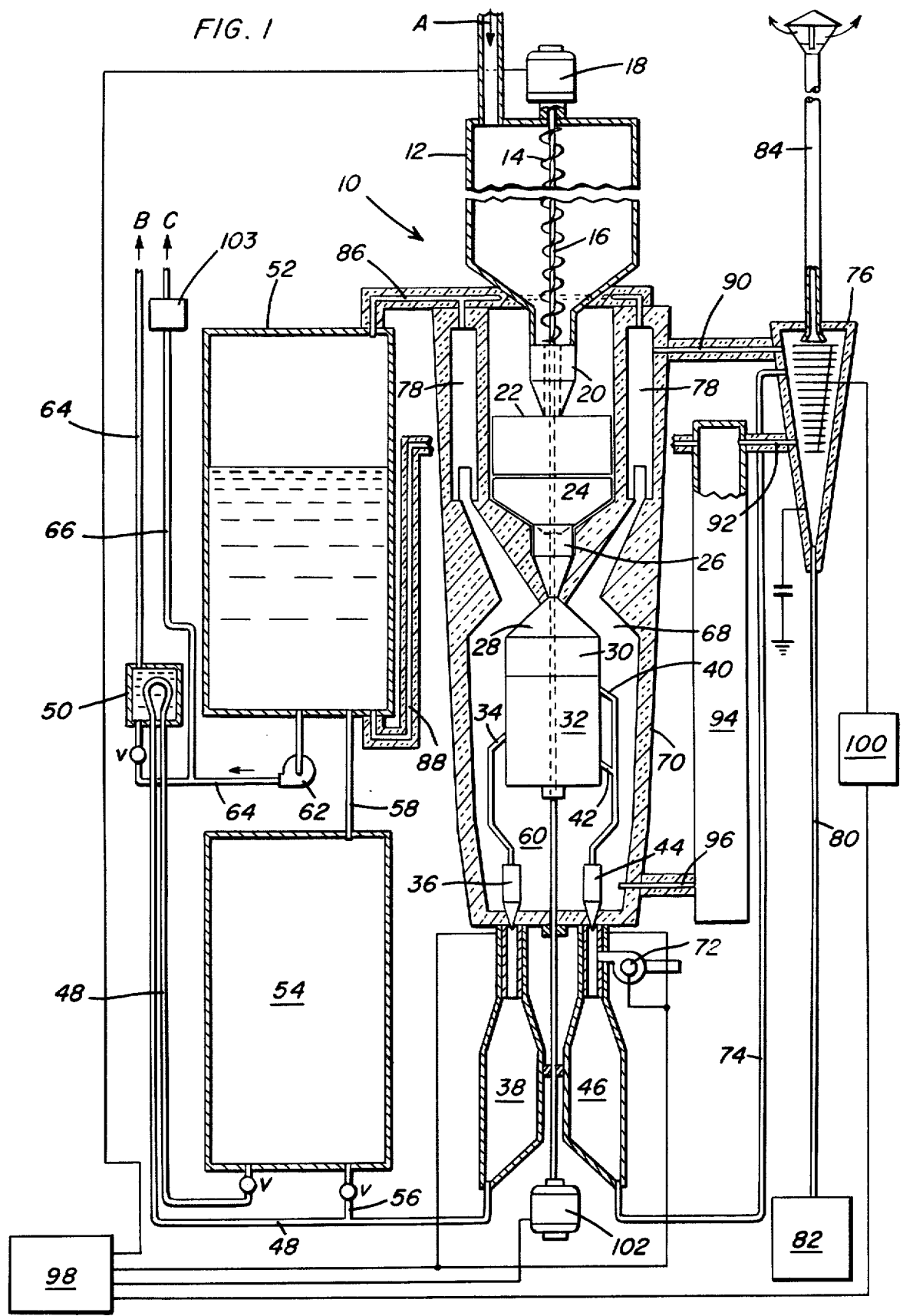
FIG. 1 is a schematic representation of the closed cycle sewage purification, waste reduction and purified water recycling system of the present invention.

Turning now to FIG. 1 the sewage purification, waste reduction and water purification and recycling system is shown generally at 10. A represents the influent to the system which consists generally of all household waste products, including waste water and recharging water, human waste, detergents, soap, oils, houshold chemicals, and the like. All influent is collected in storage influent tank 12 where it is continually agitated by a screw type circulator 14 operated from a central shaft 16 suitably journaled on bearings (not shown) and powered by a conventional electric motor 18. The constant agitation imparted by the screw type circulator 14 is necessary to prevent the settling out of heavy and light solids in the influent. At the same time the screw serves to reduce the bulk size of solids in the influent to a smaller and more uniform size.

Influent A is fed from the influent tank 12 to a unit 20 which further reduces influent particle size and which injects the influent under pressure into the influent homogenizer, size reducer and pressure injection portions of the system. Preferably, unit 20 is a screw-type cutter-injector which operates from shaft 16. A screw-type unit is particularly suited for use herein because, at equal speeds, two such cutter-injectors of different diameters will produce a differential pressure which promotes efficiency of operation. Moreover, this type cutter-injector provides automatic overpressure relief. The primary function of unit 20 is to produce solid particles of uniform size which, upon proceeding through the system, will promote smooth and steady operation of subsequent units. Of course, the smaller the particles expelled by unit 20 the less work demand on subsequent size reduction units.

Influent A under pressure from unit 20 is forced through the primary particle size reduction and homogenization unit 22 wherein the solid particles in the waste are reduced to atomizable size. The waste particles must be as small as possible at this time in order that they can pass freely through the spray-fog nozzle or atomizer 26 without risk of plugging or malfunctioning the atomizer. Moreover, as will appear more clearly hereinafter, for subsequent solid waste water separation to be most effective, the solid waste particles must be very small. Homogenizer 22 should preferably be a multi-pass unit which is capable of producing a uniform mixture of the influent (small waste particles and water) intermixed with air bubbles to aid the homogenization. It has been noted that single pass units are of greatly reduced effectiveness for this purpose and are not recommended.

To homogenized influent is next forced into an injection unit 24 which injects it through nozzle unit 26 As previously indicated, nozzle unit 26 may be an atomizing spray fog nozzle. The fogged or atomized influent upon leaving the nozzle is sprayed into a cryogenic crystallization chamber 28 where it is exposed to temperatures of about −120° C. The particulate influent is instantly frozen in crystalline form. Due to the differences in freezing points, at least three identifiable categories of crystal appear to form — water, light crystals of solid waste and heavy crystals of solid waste Instantaneous freezing as occurs at cryogenic temperatures produces a number of desired and necessary results. First, the cryogenic temperature maintains the influent in permanent solid state which is required for subsequent separation. Higher temperature freezing would permit particles to return to the liquid state when subsequently subjected to mechanical or electronic energy incident to the production of extremely fine particle crystals and during centrifugal separation. Also, the influent must remain in the solid state in order that the purity of the crystals be maintained and to prevent undesirable mixing of water and other portions of the influent. Further, cryogenic freezing creates individual crystals as it acts upon the fogged influent material and thus becomes a first stage in the waste separation process.

The cryogenically frozen crystalline particles are next processed to further homogenize the crystal mixture and to finally reduce the particle size to the critical size for effective centrifugal separation. In homogenizer-reducer 30 the crystals are subjected to a blending to prevent the collection of multiple crystals into individual large crystals which may trap impurities and create non-uniform crystal sizes. In addition, the individual crystal size is reduced to produce solid material that is of extremely fine texture, approximating the particle size of fine flour particles or smaller, which material takes on and exhibits the flow characteristics of a liquid. While it is not desired to limit the process to a specific crystalline size, since the precise size will depend upon the design of the centrifugal separator and associated equipment, it is necessary that the frozen crystalline particles be sufficiently small that the mass takes on the characteristics of a liquid.

The frozen, properly sized crystals are introduced into the cryogenic centrifugal gravity separator 32, preferably a multiple stage separator, which separates water in crystal form from the light and heavy solids of the influent. Separator 32 acts upon the crystals in much the same manner as conventional centrifugal separators effect liquid-liquid density separations. The water crystals are metered from separator 32 via line 34 through a crystal injector 36 into a high temperature steam chamber 38. The light and heavy solid waste crystals are directed from separator 32 via lines 40 and 42 through crystal injector 44 into an incinerator or combustion chamber 46.

Figure 2:
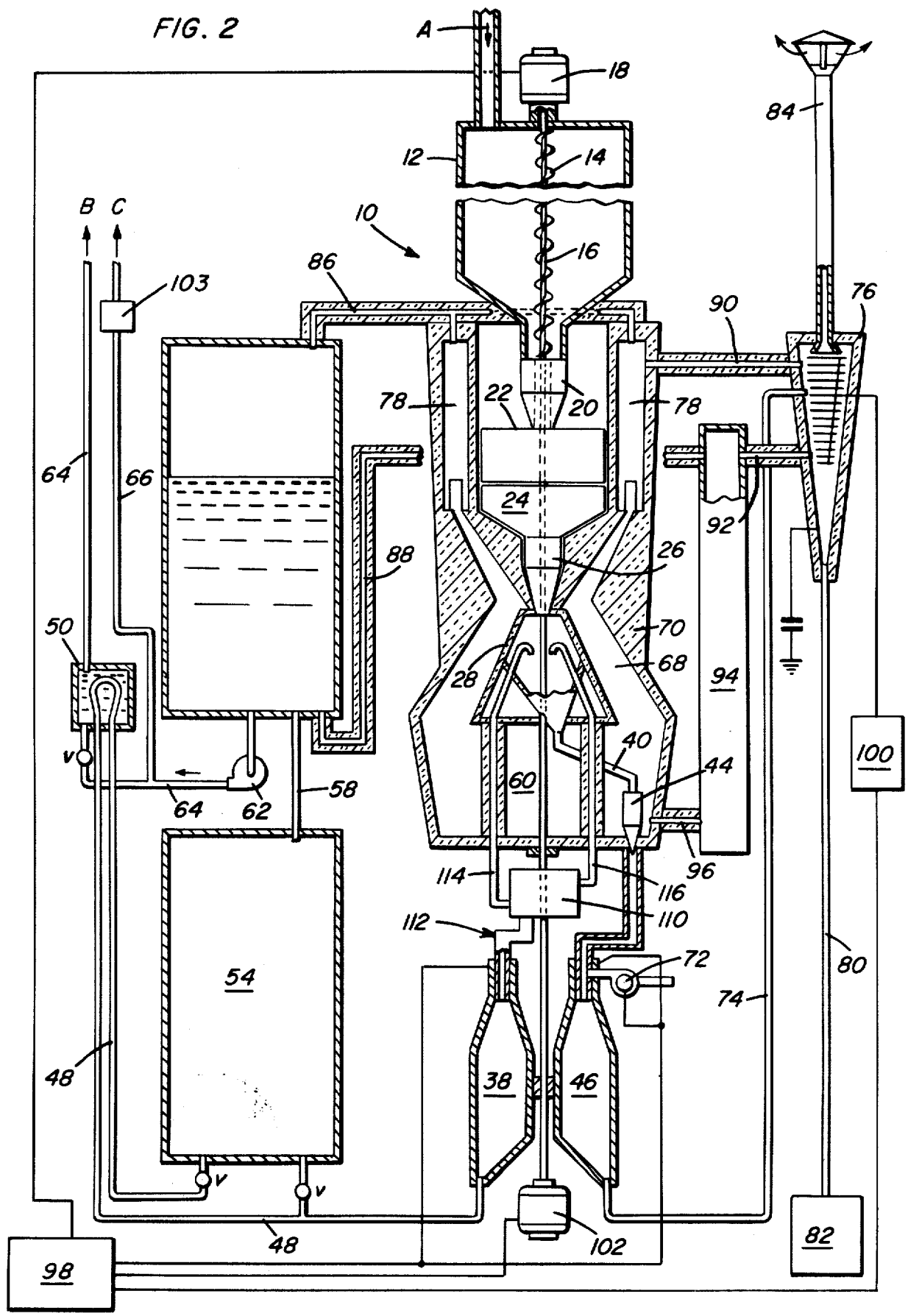
FIG. 2 is a schematic representation of another embodiment of the closed cycle system of FIG. 1.

In another embodiment of the present invention, shown in FIG. 2, homogenizer-reducer 30, centrifugal separator 32, water crystal injector 36 and lines 34 and 42 are omitted from the system. Water vapor is continuously removed from the atomized spray entering cryogenic crystallization chamber 28 prior to freezing by maintaining a constant vacuum on chamber 28 using vacuum pump system 110, including vacuum lines 114 and 116, operating from shaft 16. The water in the atomized sewage is drawn off as vapor immediately upon exposure to the vacuum environment. Although not a critical value, for best results a vacuum of about 30 millibars is preferably maintained on chamber 28 at all times. The water vapor is directed via water vapor line 112 into high temperature steam chamber 38. The crystalline solid waste moves via line 40 through crystal injector 44 into the incinerator or combustion chamber 46.

Steam chamber 38 is a conventional chamber which utilizes electrical or other conventional forms of energy to produce heat. Electrical resistance heating is preferred because there are no immediate waste products for disposal. The steam produced in chamber 38 is directed to two points. Steam line 48 leads to heat exchanger 50 wherein it exchanges heat with condensed steam from condenser 52 to produce hot water $B$ for recycling and then returns the steam to filter unit 54. Steam line 48 also has a branch line 56 which leads directly into filter unit 54. Steam from filter unit 54 is directed via steam line 58 to condenser 52. Condensation of the steam is accomplished in a fast and efficient manner by utilizing a portion of the closed cycle cryogenic system to exchange the heat. Specifically, a portion of the cold gas outfall from cryogenic sump 60, as will be more fully explained hereinafter, is taken from gas collection chamber 78 and used to produce rapid condensation of steam in the condenser 52. After condensation, the water in condenser 52 is collected by gravity and pumped from the condenser by pump 62 via discharge line 64. A portion of the water in line 64 flows through heat exchanger 50 where it is heated by steam to produce hot water $B$ for storage and/or recycling to the household. A branch 66 of discharge line 64 carries cold water $C$ to storage and/or recycling to the household. A filter and aerator unit 103 is preferably incorporated in branch 66 to provide for taste improvement of the processed potable water.

Combustion chamber 46 has, as an integral part thereof, a high pressure air pump 72 to supply the necessary surplus oxygen for complete combustion of the solids in the influent to permit addition of catalytic or other ingredients to aid in the formation of desirable combustion products. Combustion gas and ashes are carried from chamber 46 through disposal line 74 to an electrostatic, cold atmosphere, cyclone ash collector and gas exhaust unit 76 in which the combustion gas and ash are separated. Cold gas from gas collection chamber 78 is supplied via insulated lines to unit 76. Ash collector pipe 80 carries solids from cyclone unit 76 to ash collector 82. Gas discharge from unit 76 is carried off through exhaust vent 84.

The cryogenic sub-system comprises a chamber 68 insulated by insulating jacket 70 to maintain the cryogenic temperatures about $-120°$ C. Chamber 68 encloses the cryogenic crystallization unit 28, homogenizer-cutter 30, centrifugal separator 32, water crystal supply line 34, light-weight crystal supply line 40, heavy-weight crystal supply line 42 and crystal injector units 36 and 44. In the embodiment of FIG. 2 chamber 68 encloses crystallization unit 28, crystal supply line 40 and crystal injector unit 44. Cold gas circulation to condenser 52 is from gas collection chamber 78 through insulated cold gas line 86. Cold gas return is via insulated cold gas line 88 to cryogenic generator 94. Cold gas circulation to electrostatic cyclone 76 is from gas collection chamber 78 through insulated cold gas line 90. Cold gas return is via insulated cold gas line 92 to cryogenic generator 94. All return gas enters the cryogenic generator 94 which converts the gas to liquid form and, in turn, supplies cryogenic liquid gas to cryogenic sump 60 through insulated cryogenic supply line 96.

Electric power to the system of the present invention is distributed through power panel 98 which powers the electric motor 18, electrostatic generator 100, steam and combustion chambers 38 and 46 and auxiliary electric motor 102, as well as any other apparatus requiring electric power.

Figure 3:
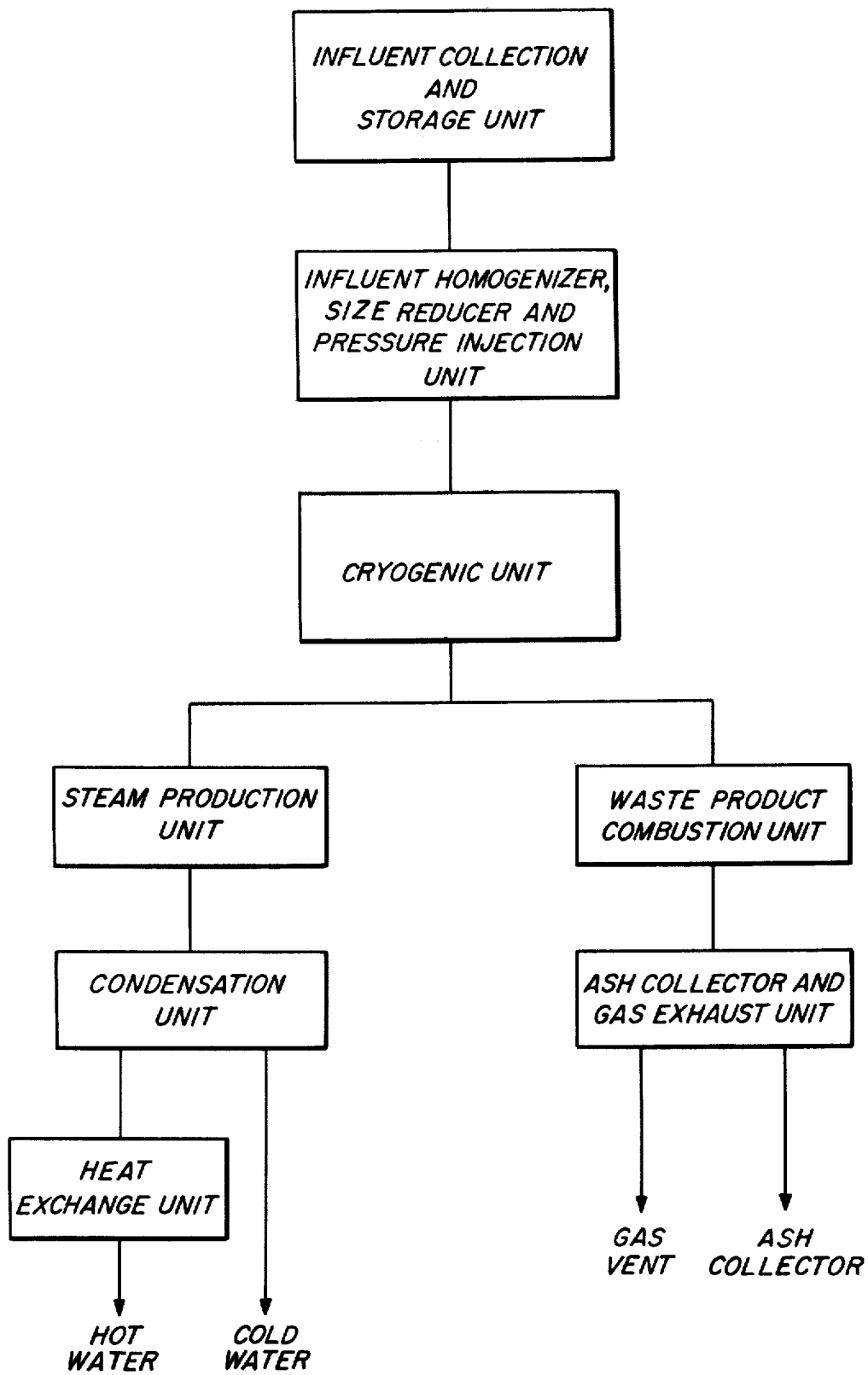
FIG. 3 is a block diagram of the process of the present invention.

FIG. 3 summarizes in block diagram form the processing of influent $A$ through the apparatus of the sewage purification, waste reduction, water purification and recycling system of the present invention. As can be seen the influent is (1) collected and stored in an Influent Collection and Storage Unit; (2) homogenized and the solid content of the sewage reduced in particle size in an Influent Homogenizer, Size Reducer and Pressure Injection Unit; and (3) frozen in atomized small crystal form, further homogenized and size reduced and centrifugally separated into water and light and heavy crystals, or vacuum separated into water vapor and solid waste and the solid waste frozen in atomized small crystal form, in a Cryogenic Unit. The water vapor or crystals are converted to steam in a Steam Production Unit, condensed in a Condensation Unit and a portion of the condensed cold water heated in a Heat Exchange Unit. The light and heavy solid waste crystals are incinerated in a Waste Product Combustion Unit and the combustion products separated and disposed of through an Ash Collector and Gas Exhaust Unit.

While the present invention has been described with reference to particular embodiments thereof it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. A process for household, commercial and industrial waste purification, reduction and water recycling comprising the steps of:
   a. homogenizing the waste;
   b. reducing the solid material in the waste to fine particle size;
   c. atomizing the waste;
   d. cryogenically freezing the atomized waste into minute crystalline particles, said particles consisting essentially of water crystals and crystals of solid waste;
   e. homogenizing and reducing the size of said particles to produce a crystalline particle mass having the flow characteristics of a liquid;
   f. centrifugally separating the water crystals from the solid waste crystals;
   g. heating the water crystals to steam and condensing the steam to water for recycling to the household; and
   h. heating said solid waste crystals to combustion gas and ash, separating said gas and ash, venting said gas and collecting said ash.

2. A process, as claimed in claim 1, wherein waste homogenization is accomplished in a series of homogenizing steps.

3. A process, as claimed in claim 1, wherein said solid material reduction is accomplished in a series of particle size reducing steps.

4. A process, as claimed in claim 1, wherein said particle size immediately prior to centrifugal separation does not exceed the particle size of fine flour.

5. A process, as claimed in claim 1, wherein cryogenic freezing is accomplished at about −120° C.

6. A process, as claimed in claim 1, including the further step of heating a portion of the condensed steam with uncondensed steam to produce hot water for recycling to the household.

7. A process, as claimed in claim 1, including the further step of cooling said combustion gas and ash prior to venting and collecting.

8. A process, as claimed in claim 7, wherein the cooling medium is a cryogenic gas.

9. A process, as claimed in claim 1, wherein the steam is condensed to water using a cryogenic gas as the heat exchange medium.

10. A process for household, commerical and industrial waste purification, reduction and water recycling comprising the steps of:
  a. collecting the waste;
  b. homogenizing the waste;
  c. reducing the solid material in the waste to a substantially uniform fine particle size;
  d. atomizing said waste to a fine particle fog;
  e. cryogenically freezing the atomized waste into minute crystalline particles, said particles consisting essentially of water crystals and crystals of solid waste;
  f. homogenizing and reducing the size of said particles to produce a crystaline particle mass having the flow characteristics of a liquid;
  g. centrifugally separating the water crystals from the solid waste crystals;
  h. heating the water crystals to steam;
  i. filtering the steam;
  j. condensing the filtered steam using a cryogenic gas heat exchange medium to produce water for recycling to the household;
  k. incinerating said solid waste crystals to combustion gas and ash;
  l. cooling and separating said combustion gas and ash using a cryogenic gas cooling medium; and
  m. venting said cooled combustion gas and collecting said cooled combustion ash.

11. A process, as claimed in claim 10, including the further step of producing hot water for recycling to the household, commercial or industrial plant by heating a portion of the condensed steam with uncondensed steam.

12. A process, as claimed in claim 10, wherein said atomized waste is cryogenically frozen at about −120° C.

13. A continuous, closed-cycle, self-contained system for purifying and reducing household, commercial and industrial wastes and purifying and recycling to the household, commerical or industrial plant for further use the water content of said waste, comprising, in combination:
  a. tank means for collecting said waste;
  b. means associated with said tank means for homogenizing said waste;
  c. means for reducing solid material in said homogenized waste to substantially uniform fine particle size;
  d. nozzle means communicating with said reducing means to receive said fine particle waste therefrom, said nozzle means having sufficiently small openings therein to produce a fine particle fog;
  e. means associated with said nozzle means for forcing said waste under pressure through said nozzle means whereupon said waste becomes a fine particle fog;
  f. a cryogenic freezing chamber communicating with said nozzle means for receiving said particle fog, said chamber including a cryogenic cooling medium therein capable of creating a temperature within said chamber of about −120° C. to instantly crystallize said waste into water crystals and solid waste crystals;
  g. means in said chamber for producing water and solid waste crystals having the flow characteristics of a liquid;
  h. centrifugal separation means in said freezing chamber for separating said water crystals from said solid waste crystals;
  i. a steam chamber for receiving said water crystals from said separator and for converting said water crystals to steam;
  j. condensing means for condensing said steam from said steam chamber to water;
  k. a combustion chamber for receiving said solid waste crystals from said separator and for converting said solid waste crystals to combustion gas and ash;
  l. means for separating said combustion ash from said combustion gas; and
  m. means for venting said gas and for collecting said ash.

14. Apparatus, as claimed in claim 13, wherein said tank means includes a screw type circulator therein for homogenizing said waste and for reducing the size of solid materials therein.

15. Apparatus, as claimed in claim 13, wherein said means for homogenizing and reducing the solid material in said waste includes a screw-type cutter.

16. Apparatus, as claimed in claim 13, further including cooling means for cooling said combustion gas and ash prior to venting and collecting.

17. Apparatus, as claimed in claim 16, wherein said cooling means includes means for passing a cryogenic gas therethrough in heat transfer relation to said combustion gas and ash as the cooling medium therefor.

18. Apparatus, as claimed in claim 13, wherein said condensing means includes means for passing a cryogenic gas therethrough in heat transfer relation to said steam as the heat exchange medium therefor.

19. Apparatus, as claimed in claim 16, further comprising an insulated cryogenic housing including said cryogenic freezing chamber therein, said housing communicating with said condensing means and said cooling means for supplying cryogenic gas thereto for condensing said steam and cooling said combustion gas and ash.

20. Apparatus, as claimed in claim 19, further comprising a cryogenic generator for converting cryogenic gas to liquid communicating with said cryogenic housing to supply cryogenic liquid thereto and conduit means from said condensing means and cooling means to said cryogenic generator for returning said cryogenic gas to said generator.

21. Apparatus, as claimed in claim 13, further including heat exchange means for heating said condensed steam to hot water, said heat exchange means receiving a portion of said water from said condensing means as its cold input and a portion of the steam from said steam chamber as its heat exchange medium.

22. Apparatus, as claimed in claim 13, wherein said means for separating said combustion gas and ash is an electrostatic, cold atmosphere cyclone separator.

23. Apparatus, as claimed in claim 13, wherein said centrifugal separation means is a multiple stage centrifugal separator.

* * * * *